United States Patent [19]

Macpherson

[11] 4,306,923

[45] Dec. 22, 1981

[54] METHOD OF SLITTING A PLASTIC JACKET OF A CONDUCTIVE CABLE

[75] Inventor: Hugh H. J. Macpherson, Edinburgh, Scotland

[73] Assignee: W. L. Gore & Associates, Inc., Newark, Del.

[21] Appl. No.: 142,977

[22] Filed: Apr. 23, 1980

[30] Foreign Application Priority Data

May 1, 1979 [GB] United Kingdom ............... 15130/79

[51] Int. Cl.[3] .......................... H02G 1/12; H01B 7/00

[52] U.S. Cl. ..................................... 156/51; 29/426.4; 30/90.4; 83/924; 156/248; 156/271; 174/10; 174/47; 174/70 R

[58] Field of Search .................... 174/10, 15 C, 24, 47, 174/68 R, 68 C, 70 R, 107, 113 R, 115, 116, 117 F; 30/90.1, 90.4; 156/344, 47, 51, 248, 271; 29/426.4, 867; 81/9.5 R, 9.5 C, 9.51; 83/924

[56] References Cited

U.S. PATENT DOCUMENTS

| | | | |
|---|---|---|---|
| 2,729,696 | 1/1956 | Mapelsden et al. | 174/117 F |
| 2,746,452 | 5/1956 | Saylors | 30/90.4 X |
| 2,910,524 | 10/1959 | Schaffhauser | 174/15 C |
| 3,098,892 | 7/1963 | Spade et al. | 174/47 |
| 3,517,110 | 6/1970 | Morgan | 174/47 |
| 3,748,371 | 7/1973 | Krook et al. | 174/10 |
| 4,026,012 | 5/1977 | Smith et al. | 30/90.4 X |
| 4,041,237 | 8/1977 | Stine et al. | 174/115 X |

FOREIGN PATENT DOCUMENTS

| | | | |
|---|---|---|---|
| 233608 | 4/1961 | Australia | 174/15 C |
| 1216956 | 5/1966 | Fed. Rep. of Germany | 174/70 R |

*Primary Examiner*—Laramie E. Askin

*Attorney, Agent, or Firm*—John S. Campbell

[57] ABSTRACT

A conductive cable having a conductive core and a protective jacket of plastic material moulded around the core, also contains a guide member, in particular a guide tube, below the jacket and into which a jacket slitting tool can be inserted.

By pushing the slitting tool along the tube, the jacket can easily be slit, the tool cutting through the side of the tube adjacent the jacket whereas the side of the tube adjacent the core guides the tool along the cable and protects the core from damage by the tool.

If the cable contains metal screening, the guide tube is located between the screening and the jacket.

2 Claims, 2 Drawing Figures

METHOD OF SLITTING A PLASTIC JACKET OF A CONDUCTIVE CABLE

BACKGROUND OF THE INVENTION

This invention relates to a method of slitting plastic jackets of conductive cables.

It is conventional practice to form a conductive cable by providing a core composed of a single insulated conductor or, more commonly, a twisted pair or plurality of insulated conductors and passing this core through an extrusion machine in which a jacket of protective material is extruded onto the conductive core. The conductors can for example be tin-plated copper conductors, having an insulation of polyester laminate (in particular that sold under registered trade mark Milene). The jacket can conveniently be polyurethane which is extruded in a hot state.

One difficulty arising with such a jacketed cable is that the hot extrusion process, in particular hot pressure extrusion, forces the jacketing material into the interstices of the conductive core and gives rise to some difficulty when the jacket has to be stripped back to form terminals. It is conventional practice in such circumstances to slit the jacket with a sharp edged tool, but to form such a slit without damaging the insulative coating on the conductors or the conductors themselves is difficult.

It is also known to provide a conductive cable comprising a core containing one or more conductors, a protective jacket of plastic material moulded around the core and means disposed below the jacket to facilitate slitting of the jacket.

In U.S. Pat. No. 3,748,371 such means comprises a cutting wire which co-operates with grooves on the underside of the jacket and a special jacket cutting tool co-operating with a groove on the outside of the jacket.

It is also known, for example from British Pat. No. 834,015 (corresponding to U.S. Pat. No. 2,729,626) to weaken the jacket locally by external grooving to facilitate cutting by the external application of a jacket-slitting tool.

BRIEF SUMMARY OF THE INVENTION

According to the present invention, the means to facilitate slitting of the jacket comprises a guide member for a jacket slitting tool, said guide member being disposed closely adjacent the jacket and being capable of receiving and guiding the jacket slitting tool to slit the jacket longitudinally while offering low resistance to movement of the tool.

The present invention also provides a method of slitting a plastic jacket of a conductive cable which is characterised by inserting a tube or other guide member along the length of the cable and below the jacket during the manufacture of the cable, inserting a jacket slitting tool in the exposed end of the guide and pushing the tool along the guide to slit the jacket.

In particular the guide member will be a tube laid in contact with the jacket or between the jacket and screening surrounding the core.

It is known from U.S. Pat. No. 3,517,110, to incorporate tubing in cables which also contain a conductive core, but such tubing is designed only to carry fluids. Such fluid-carrying tubes are spaced from the jacket and normally will lie close to the axis of the cable to minimise their length. Moreover they will be made of a material designed for the purpose for which they are intended, and not merely to guide a slitting tool. A guide member need not be a complete tube and need not be fluid tight.

In particular, the guide is formed by a tube of material which will resist the heat of the extruded polyurethane and suitable materials for such a tube are polytetrafluoroethylene (PTFE) or fluorinated ethylene propylene (FEP).

When the cable has been completed, a sharp single edged tool can be fitted into the open end of the guide tube and pushed along the cable to slit through the side of the guide tube remote from the conductive core and through the covering portion of the jacket. The side of the guide tube, which contacts the conductive core, will protect the core from the tool (assuming the tool is blunt on the side directed towards the core). Once the jacket has been slit in this way, it can be readily peeled back from the conductive core over the length which has been slit by the tool.

DETAILED DESCRIPTION

Figure 1:
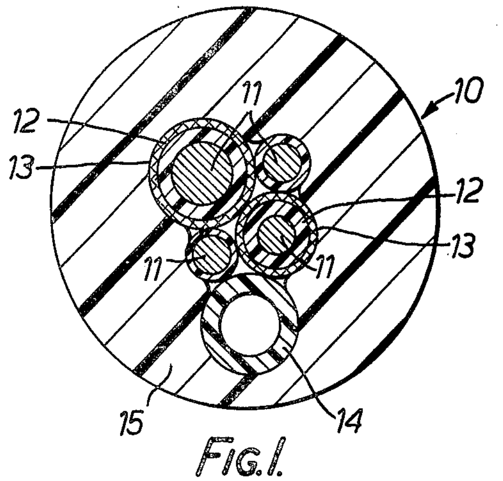
FIG. 1 shows a section through a cable provided with a guide member for a jacket slitting tool in accordance with the invention.

As shown in FIG. 1, the cable 10 comprises four copper conductors 11 each provided with an insulative coating 12 of polyester laminate (in particular that sold under the registered trade mark Milene) two of which are further covered by braided copper screens 13, spaced apart, the conductors 11 having been twisted together before introduction into the extrusion machine. A thin-wall tube 14 of PTFE or FEP is laid alongside the twisted core and both are introduced into the die of the extrusion machine and a jacket 15 of molten polyurethane is formed around the conductive core and guide tube 14, the jacket upon cooling solidying to form a protective jacket which extends closely around the guide tube 14 and into the interstices between the insulated conductors 11.

A suitable jacket slitting tool capable of being inserted into the tube is that used for cutting stitches in garments, being formed with a needle-like guide portion and a cutting edge extending rearwardly from the guide portion. In performing the method of the invention, the tool is fitted into the open end of the tube 14 and pushed along the tube cutting easily through the wall of the tube and then through the jacket in the manner of a plough, to slit the jacket longitudinally.

The present invention is particularly applicable to telephone cables or other telecommunications cables containing delicate thin-wall-insulated conductors, e.g. signal conductors in the form of twisted pairs, triples or quads, either screened or unscreened and contained within a thickwall tough jacket such as polyurethane of over 1 mm wall thickness. If the core does not have an overall screen, the guide tube will be laid directly under the jacket and may be either cabled into the last pass in the cable manufacture, or laid over the core if the jacket thickness is sufficient to conceal the tube.

If however the cable has an overall screen, the guide tube will be laid directly under the jacket and outside the overall screen.

Typical dimensions for guide tubes are 50–100 thousandth of an inch (1.27 to 2.54 mm) internal diameter and 75–125 thousandths of an inch (1.9 to 3.17 mm) external diameter. The characteristics of the tube will be such as to offer minimum resistance to movement of the jacket slitting tool.

Figure 2:
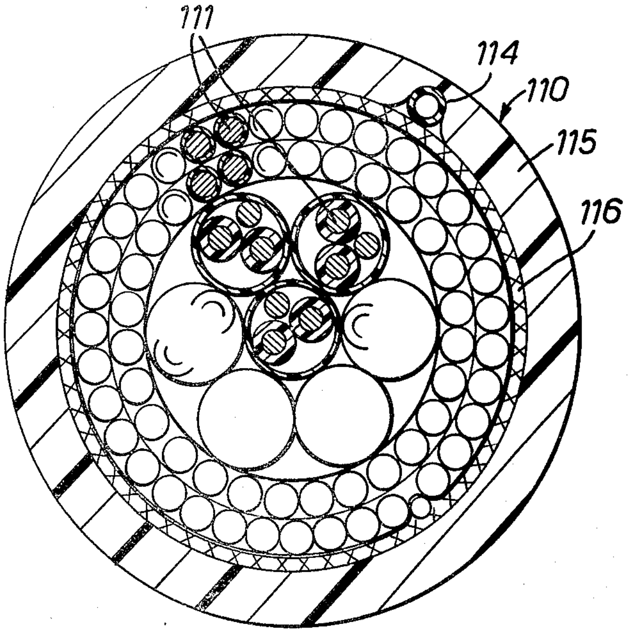
FIG. 2 shows a section through another form of cable provided with a guide member for a jacket slitting tool in accordance with the invention.

In FIG. 2 of the drawing is shown a cable 110 containing a conductive core 111, overall braided metal screening 116, and a jacket 115 of polyurethane. In this embodiment, the guide tube 114 is laid over the screening 116 and embraced by the moulded jacket 115. The details of the core form no part of the present invention but will be seen to consist of a centre section of seven twisted pairs of insulated wires surrounded by two concentric rows of insulated single wires.

It will be evident that both in FIG. 1 and FIG. 2 the jacket has been moulded in contact with the guide tube over a very substantial proportion of the periphery of the tube, viz. more than half in FIG. 1 and approximately half in FIG. 2.

I claim:

1. A method of slitting a plastic jacket of a conductive cable which comprises, inserting a guide member, capable of receiving a sharp-edged slitting tool, along the length of said cable and below said jacket during the manufacture of said cable, inserting a sharp-edged slitting tool in one end of said guide member, and pushing said tool along said guide member to slit said jacket.

2. The method of claim 1 in which said guide member is a tube.

* * * * *